United States Patent
Sasaki (10) Patent No.: US 9,670,893 B2
(45) Date of Patent: Jun. 6, 2017

(54) IGNITION TIMING CONTROL APPARATUS FOR AN INTERNAL COMBUSTION ENGINE

(75) Inventor: Yuji Sasaki, Hadano (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 615 days.

(21) Appl. No.: 14/112,610

(22) PCT Filed: Feb. 13, 2012

(86) PCT No.: PCT/JP2012/053287
§ 371 (c)(1),
(2), (4) Date: Nov. 7, 2013

(87) PCT Pub. No.: WO2012/147388
PCT Pub. Date: Nov. 1, 2012

(65) Prior Publication Data
US 2014/0102413 A1    Apr. 17, 2014

(30) Foreign Application Priority Data

Apr. 25, 2011   (JP) .................................. 2011-096732

(51) Int. Cl.
*F02P 5/04*     (2006.01)
*F02P 5/15*     (2006.01)
(Continued)

(52) U.S. Cl.
CPC ............. *F02P 5/045* (2013.01); *F02P 5/1502* (2013.01); *F02D 41/18* (2013.01);
(Continued)

(58) Field of Classification Search
None
See application file for complete search history.

(56) References Cited

U.S. PATENT DOCUMENTS 5,875,756 A * 3/1999 Kamura ............. F02D 41/2422
                                                                 123/295
6,273,056 B1 * 8/2001 Shirakawa ............. F02M 26/28
                                                                 123/305

(Continued)

FOREIGN PATENT DOCUMENTS

EP       0826880 A2    3/1998
EP       0831227 A2    3/1998
(Continued)

OTHER PUBLICATIONS

Malaysian Office Action dated Aug. 14, 2015 issued in corresponding Malaysian Patent Application No. PI 2013003827 (3 pages).

*Primary Examiner* — Hung Q Nguyen
*Assistant Examiner* — Brian P Monahon
(74) *Attorney, Agent, or Firm* — Drinker Biddle & Reath LLP (57) ABSTRACT

The present invention is provided with: an injection timing detection unit; an engine rotation speed detection unit; an engine load detection unit; and a storing unit for storing control data of the variation in optimal ignition timing with respect to engine speed and engine load, and control data of correction coefficient pertaining to optimal ignition timing with respect to the engine load at a specific fuel injection timing. Referring to the control data, the variation in the optimal ignition timing is determined based on the detected fuel injection timing and the detected engine rotation speed; and, referring to the control data, the variation in the optimal ignition timing is determined based on the specific fuel injection timing and the detected engine speed, and the deviation between the respective variation in the optimal injection timing is determined.

4 Claims, 8 Drawing Sheets

(51) Int. Cl.
*F02D 41/18* (2006.01)
*F02D 41/24* (2006.01)
(52) U.S. Cl.
CPC .. *F02D 41/2422* (2013.01); *F02D 2200/0618* (2013.01); *F02D 2200/101* (2013.01); *Y02T 10/46* (2013.01)

(56) References Cited

U.S. PATENT DOCUMENTS

| | | | | |
|---|---|---|---|---|
| 2002/0033164 | A1* | 3/2002 | Ogawa | F02D 41/3064 123/295 |
| 2005/0092303 | A1* | 5/2005 | Oki | F02D 41/0087 123/480 |
| 2007/0012290 | A1* | 1/2007 | Yamaguchi | F02D 35/023 123/406.47 |
| 2007/0271025 | A1 | 11/2007 | Yasui et al. | |
| 2008/0243358 | A1* | 10/2008 | Kojima | F02D 35/025 701/102 |
| 2010/0274463 | A1 | 10/2010 | Itog et al. | |
| 2010/0312456 | A1* | 12/2010 | Nishimura | F02D 35/023 701/103 |
| 2011/0301827 | A1* | 12/2011 | Toyohara | F02D 31/008 701/104 |

FOREIGN PATENT DOCUMENTS

| | | | |
|---|---|---|---|
| EP | 2 236 814 A2 | 10/2010 | |
| JP | 8-189449 A | 7/1996 | |
| JP | 10-47121 A | 2/1998 | |
| JP | EP 0831227 A2 * | 3/1998 | ............. F02D 37/02 |
| JP | 2007-092554 A | 4/2007 | |
| JP | 2010133256 A | 6/2010 | |
| RU | 2027050 C1 | 1/1995 | |
| SU | 891979 A1 | 12/1981 | |

\* cited by examiner

BASIC CONTROL DATA

FIG. 5

INFLUENCE OF INJECTION START ANGLE ON MBT
(DUE TO DIFFERENCE IN ENGINE ROTATION SPEED)

VARIATION CONTROL DATA FOR EACH ROTATION SPEED AND INJECTION TIMING

FIG. 8

CORRECTION EFFICIENCY CONTROL DATA
WITH RESPECT TO LOAD

IGNITION TIMING CONTROL APPARATUS FOR AN INTERNAL COMBUSTION ENGINE

TECHNICAL FIELD

The present invention relates to an ignition timing control apparatus for an internal combustion engine.

BACKGROUND ART

In order to achieve optimum values for an ignition signal and a fuel injection signal of the engine, an engine control apparatus has been known in which the optimum ignition control data is stored in advance with respect to the various control information regarding the operating state of the engine, and in response to measurement data from an input measurement section and input data from the input section and the output information receiving section, by referring these input data to the optimum ignition control data, the corrected control data for the optimal ignition signal that corrects the measurement data is calculated (Patent Document 1).

PRIOR ART DOCUMENTS

Patent Document: Japanese Patent Application Publication No. H8-189449

SUMMARY OF THE INVENTION

Problem to be Solved

However, in the engine control device of the prior art described above, it is necessary, when assuming two factors of engine load and engine speed as the control information regarding the engine, to prepare a plurality of control maps each corresponding to each injection timing. Thus, there is a problem involving an effort to prepare (to fit) a control map with the large calculation load associated.

The objective of the present invention resides in providing an ignition timing control apparatus or system that can reduce the efforts (of fitting) to prepare a control map when obtaining an optimal ignition timing with respect to a fuel injection timing as well as decrease the calculation load associated.

Mechanism for Solving the Problem

The present invention solves the problem described above by obtaining, at a current or actual engine rotation speed, a deviation between an optimal ignition timing with respect to a specific injection timing and an optimal ignition timing with respect to a current or actual fuel injection timing, and by obtaining a correction coefficient with respect to a current or actual engine load, to thereby obtain a variation or change amount in the optimal ignition timing based on the deviation in the optimal ignition timing and the correction coefficient.

In an embodiment, the invention provides an ignition timing control apparatus for a spark ignition internal combustion engine which injects fuel directly into a combustion chamber, including an injection timing detection unit for detecting a fuel injection timing, a rotation speed detection unit for detecting an engine rotation speed, a load detection unit for detecting an engine load, a storing unit for storing control data of variation in an optimal ignition timing with respect to an engine rotation speed and a fuel injection timing and control data of a correction coefficient of the optimal ignition timing with respect to an engine load, and a control unit for obtaining an optimal ignition timing based on the fuel injection timing detected by the injection timing detection unit, the engine rotation speed detected by the rotation speed detection unit and the engine load detected by the load detection unit. The control unit acquires a variation in the optimal ignition timing based on the detected fuel injection timing and the detected engine rotation speed by referring to the control data, a variation in the optimal ignition timing based on a previously determined, specific fuel injection timing and the detected engine rotation speed by referring to the control data, a deviation between these variations of the optimal ignition timing, a correction coefficient with respect to the detected engine load by referring to the control data of the correction coefficient, and a variation in the optimal ignition timing after correction based on the deviation of the variations of the optimal ignition timing and the correction coefficient.

Effect of the Invention

According to the present invention, based on the finding that the variations in the optimal ignition timing with respect to a fuel injection timing is affected by an engine rotation speed and engine load differently, and the optimal ignition timing with respect to an engine load is used as a correction coefficient, the calculation load when calculating the optimal ignition timing with respect to a fuel injection timing may be mitigated.

EMBODIMENT FOR CARRYING OUT THE INVENTION

Figure 1:
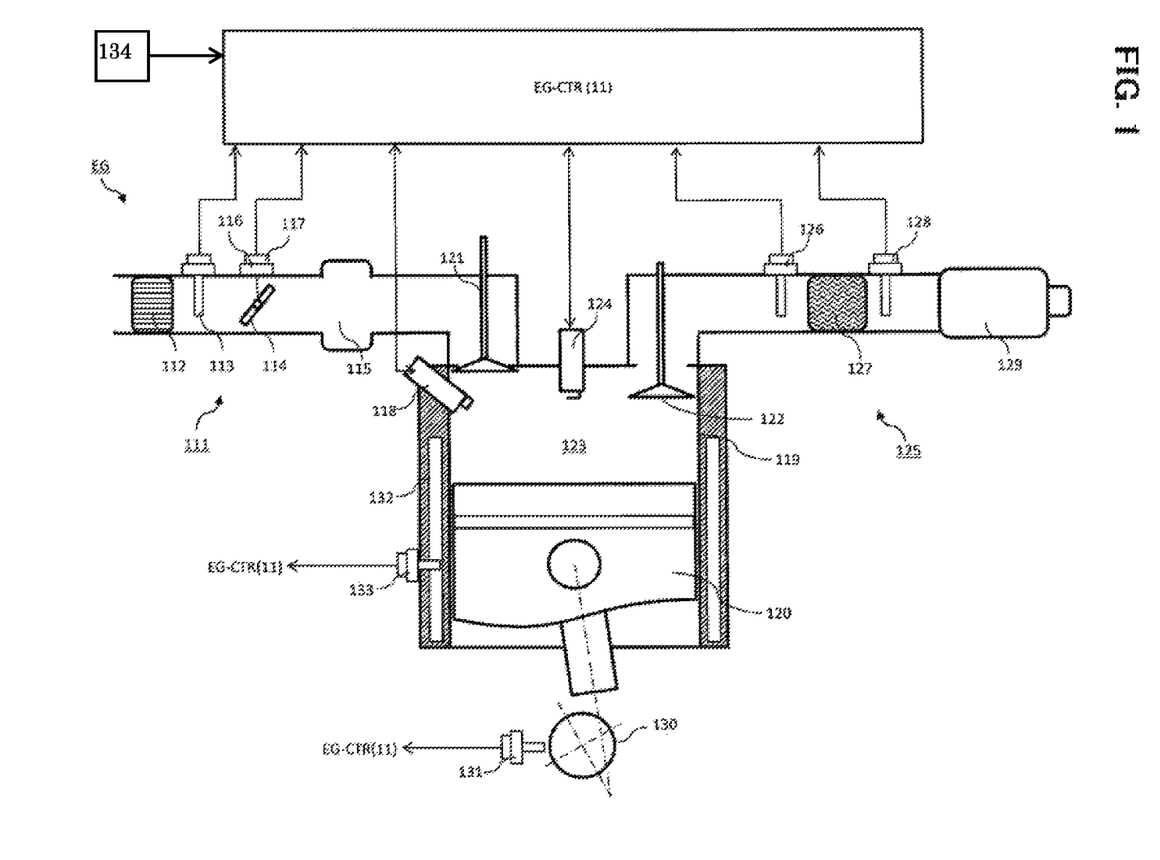
FIG. 1 is a block diagram illustrating an internal combustion engine to which an embodiment of the present invention is applied.

FIG. 1 is a block diagram illustrating an internal combustion engine to which an embodiment of the present invention is applied. More specifically, the ignition timing control apparatus according to the present invention is now described as applied to a so-called in-cylinder, direct injection spark-ignition engine EG.

In FIG. 1, an intake passage 111 of the engine EG is provided with an air filter 112, an air flowmeter 113 for detecting the intake air flow rate, a throttle valve 114 for controlling the intake air flow rate and a collector 115 throttle valve.

The throttle valve 114 is provided with an actuator 116 such as a DC motor that adjusts the opening degree of the throttle valve 114. The throttle valve actuator 116 electronically controls the opening of the throttle valve 114 in response to a drive signal from the engine control unit 11 so as to achieve the required torque calculated based on the accelerator pedal operation amount of the driver. Further, a throttle sensor 117 for detecting the opening of the throttle valve 114 is provided and its detection signal will be output to the engine control unit 1. In addition, the throttle sensor 117 can also serve as an idle switch.

A fuel injection valve 118 is provided so as to face a combustion chamber 123. The fuel injection valve 118 is configured be subjected to a driving pulse signal set by the engine control unit 11 to be driven to open and inject directly into the cylinder a fuel that in turn is fed from a fuel pump (not shown) at a predetermined pressure by way of a pressure regulator.

A combustion chamber 123 is defined by a space surrounded by a cylinder 119, a crown surface of a piston 120 reciprocally movable within the cylinder, a cylinder head provided with an intake valve 121 and an exhaust valve 122. A spark plug 124 is mounted to be exposed to the combustion chamber 123 and ignites an intake air-fuel mixture based on an ignition signal from the engine control unit 11. The present invention is intended to control the ignition signal to the ignition plug 124 so as to maximize the output torque in relation to the fuel injection timing of the fuel injection valve 118.

Meanwhile, an exhaust passage 125 is provided with an air-fuel ratio sensor for detecting an air-fuel ratio of the exhaust, thus of the intake air mixture by detecting an oxygen concentration and its detection signal is output to the engine control unit 11. The air-fuel ratio sensor 126 may be an oxygen sensor for a rich/lean output, or may be a broad air-fuel ratio sensor for detecting over an air-fuel ratio linearly over a wide range.

Further, the exhaust passage 125 is provided with an exhaust gas purifying catalyst 127 for purifying exhaust gas. As the exhaust gas purifying catalyst 127, a three-way catalyst may be used to purify the exhaust gas by performing the oxidation of hydrocarbons HC and carbon monoxide CO and the reduction of nitrogen oxides NOx in the exhaust in the vicinity of stoichiometric (stoichiometric air-fuel ratio, $\lambda=1$, the air weight/fuel weight=14.7). Alternatively, an oxygen catalyst may be used for oxidizing hydrocarbons HC and carbon monoxide CO in the exhaust gas.

On the downstream side of the exhaust gas purifying catalyst 127 of the exhaust passage 125, an oxygen sensor 128 is provided to detect a specific component in the exhaust gas, for example, to detect the oxygen concentration so as to provide a rich/lean output. The detection signal is output to the engine control unit 11. Note that, in accordance with the detection value of the oxygen sensor 128, by performing correction on the air-fuel feedback control based on the detection value of the air-fuel ratio sensor 126, a downstream side oxygen sensor 128 is provided such that a suppression on a control error caused by the deterioration of the exhaust purifying catalyst 127 and the like is achieved (so as to adopt a so-called double air-fuel ratio sensor system). However, when it is sufficient to perform an air-fuel ratio feedback control only based on a detection value of the air-fuel sensor 126, the oxygen sensor 128 may be eliminated.

In addition, 129 is a muffler in FIG. 1.

A crankshaft 130 of the engine EG is provided with a crank angle sensor 131. The engine control unit 11 may detect an engine rotation speed Ne either by counting a unit crank angle signal over a predetermined time generated from the crank angle sensor 131 in synchronization with engine rotation or by measuring the period of the crank reference angle signal.

A cooling jacket 132 of the engine EG is provided with a water temperature sensor 133 that is exposed to the cooling jacket for detecting and outputting a coolant temperature Tw of the cooling jacket 131 to the engine control unit 11.

Note that, in an in-cylinder direct-injection spark-ignition engine EG, when the ignition timing of the ignition plug 124 is controlled to an optimal value in accordance with the fuel injection timing of the fuel injection valve 118, the output torque becomes maximum and a fuel efficiency is improved. The optimal ignition timing with respect to the fuel injection timing is largely affected by the operating state of the engine represented by the engine load and engine speed.

Figure 5:
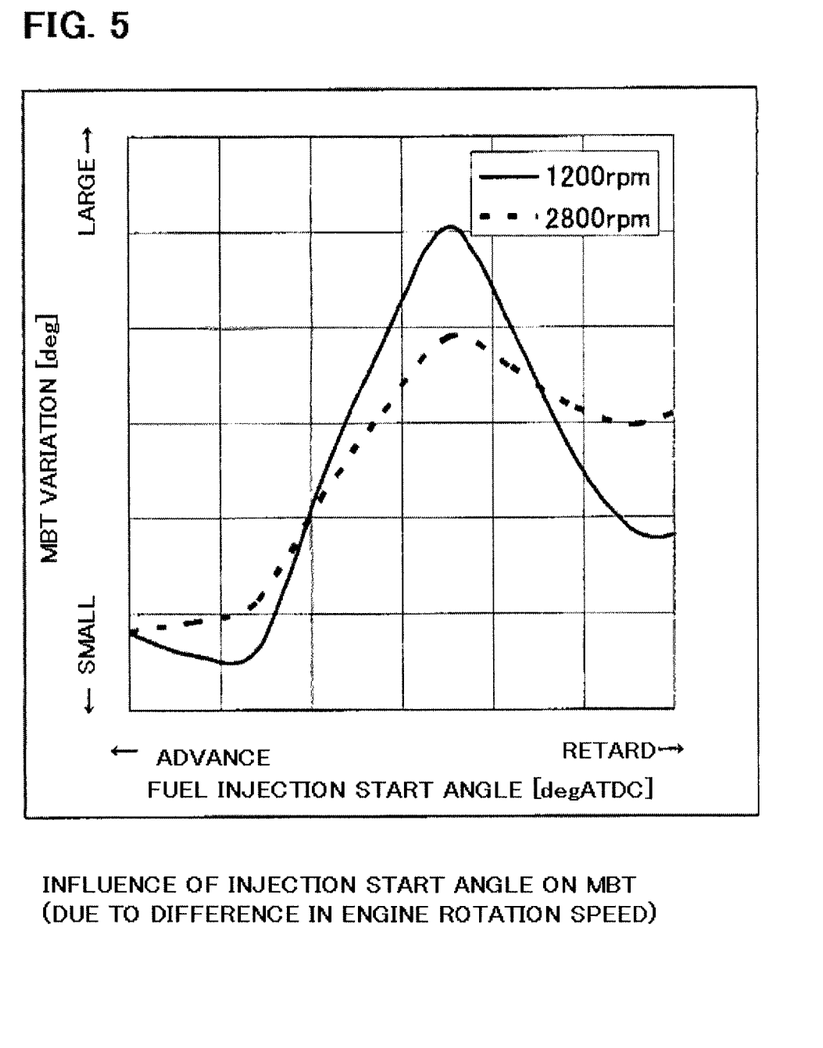
FIG. 5 is a graph showing the relationship between the optimum ignition timing and fuel injection timing due to the change in engine rotation speed.

FIG. 5 is a graph which confirmed experimentally the relationship between a fuel injection timing (shown by a fuel injection start angle in the horizontal axis (degATDC=indicated by a crank angle After Top Dead Center in the intake stroke) and the optimal ignition timing (indicated by the MBT (Maximum Brake Torque) variation or change amount in the vertical axis) when engine speed is subjected to 1200 rpm, and 2800 rpm, respectively. It can be seen that the characteristics of the optimum ignition timing for the fuel injection timing varies complicatedly due to change of the engine rotation speed.

Figure 6:
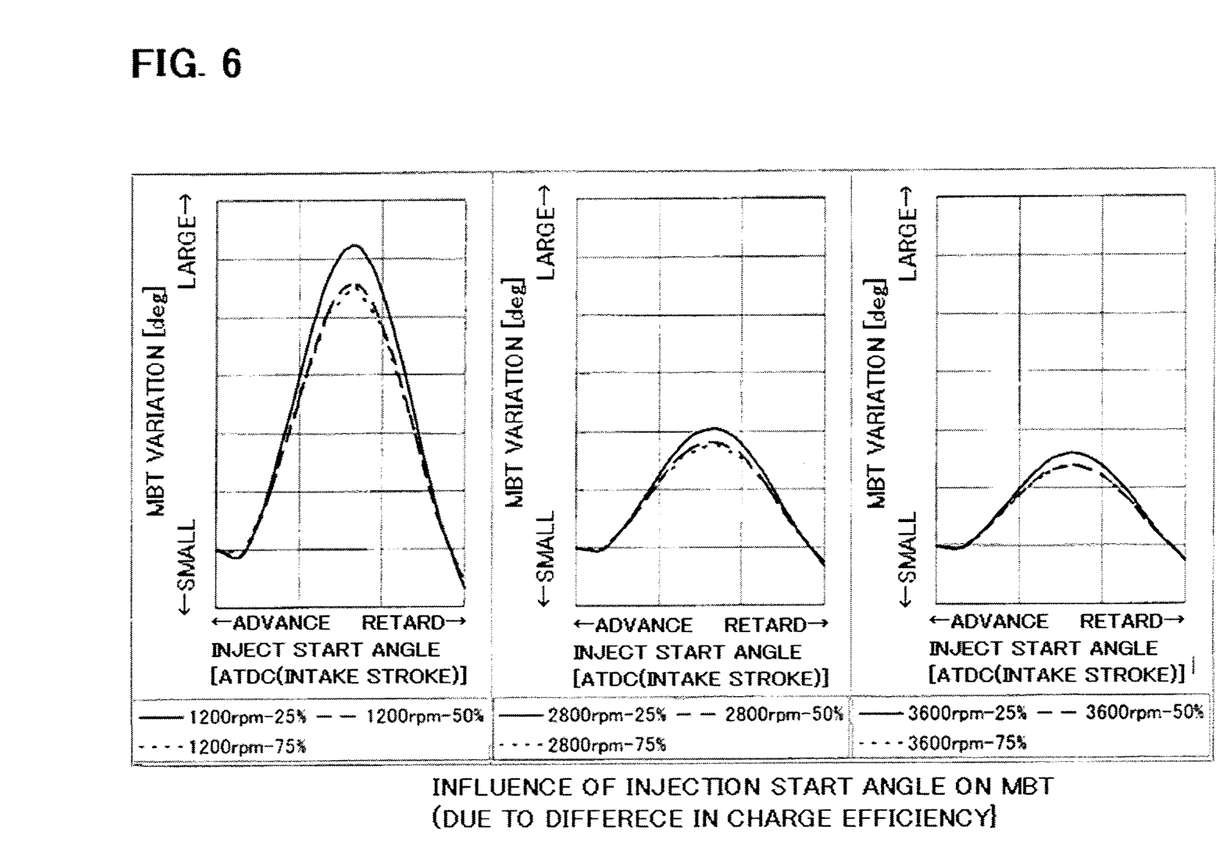
FIG. 6 is a graph showing the relationship between the fuel injection timing and the optimum ignition timing due to the change in engine load.

Meanwhile, FIG. 6 respectively show a graph which confirmed experimentally the relationship between the fuel injection timing (shown by a fuel injection start angle of the horizontal axis (degATDC)) and an optimal ignition timing (shown by a MBT variation or change amount in the vertical axis) when the engine rotation speed is set to 1200 rpm (left), 2800 rpm (central figure), 3600 rpm (right) while setting an engine load at 25%, 50% and 75% (shown by an engine charging efficiency (%)) at each engine rotation speed fuel injection start angle (indicated by degATDC)). According to the results of the figure, along with the change in engine load, the variation or change amount of the optimum ignition timing is increased as the engine load is lower. However, at each engine load, the fuel injection timing at which the variations of the optimal ignition timing becomes a peal is about the same. Further, despite the change in engine rotation speed, the variation in the optimal ignition timing with respect to the engine load is substantially the same. In other words, although the absolute value of the optimal ignition timing may change in response to the change in engine load, the relative characteristic (profile) hardly change. Note that the crank angle range (deg) and load (charging efficiency %) in FIGS. 5, 6 are not necessarily identical.

Thus, although the optimum ignition timing with respect to the fuel injection timing may be affected by engine load and engine speed, but the degree of influence is different between the engine load and engine speed. That is, the present inventors have discovered that, while the influence of the optimum ignition timing with respect to the fuel injection timing due to the change in engine speed is complex, the influence to the optimal ignition timing with respect to a fuel injection timing due to change in engine load is relatively simple as compared to the change in engine speed. Moreover, based on these findings, when the control data is configured, the calculation load for the optimal ignition timing may be mitigated.

Figure 4:
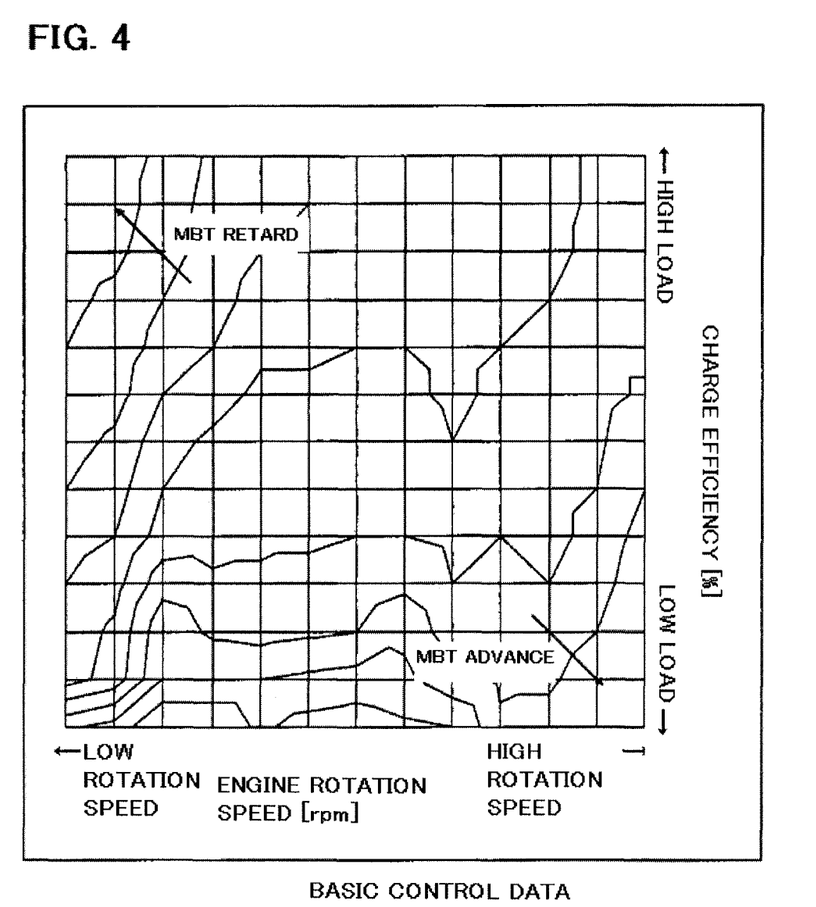
FIG. 4 is a control map showing an example of a basic control data stored in the engine control unit in FIG. 1.
Figure 7:
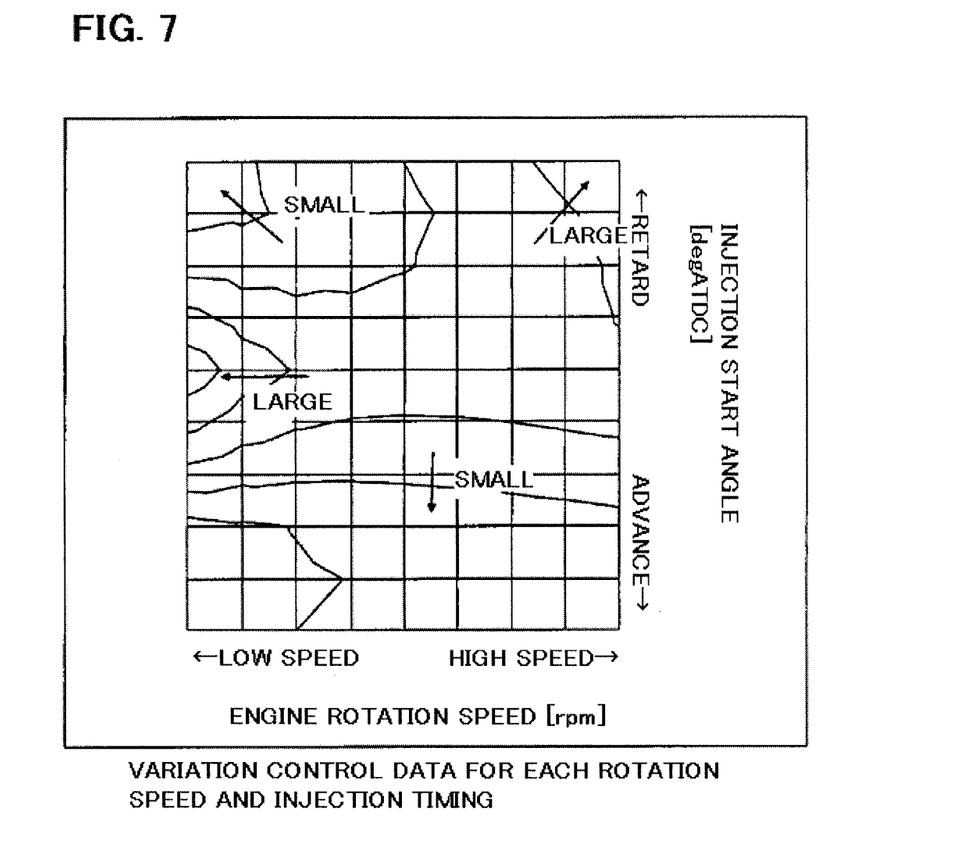
FIG. 7 is a control map showing an example of a change amount of the control data stored in the engine control unit in FIG. 1.
Figure 8:
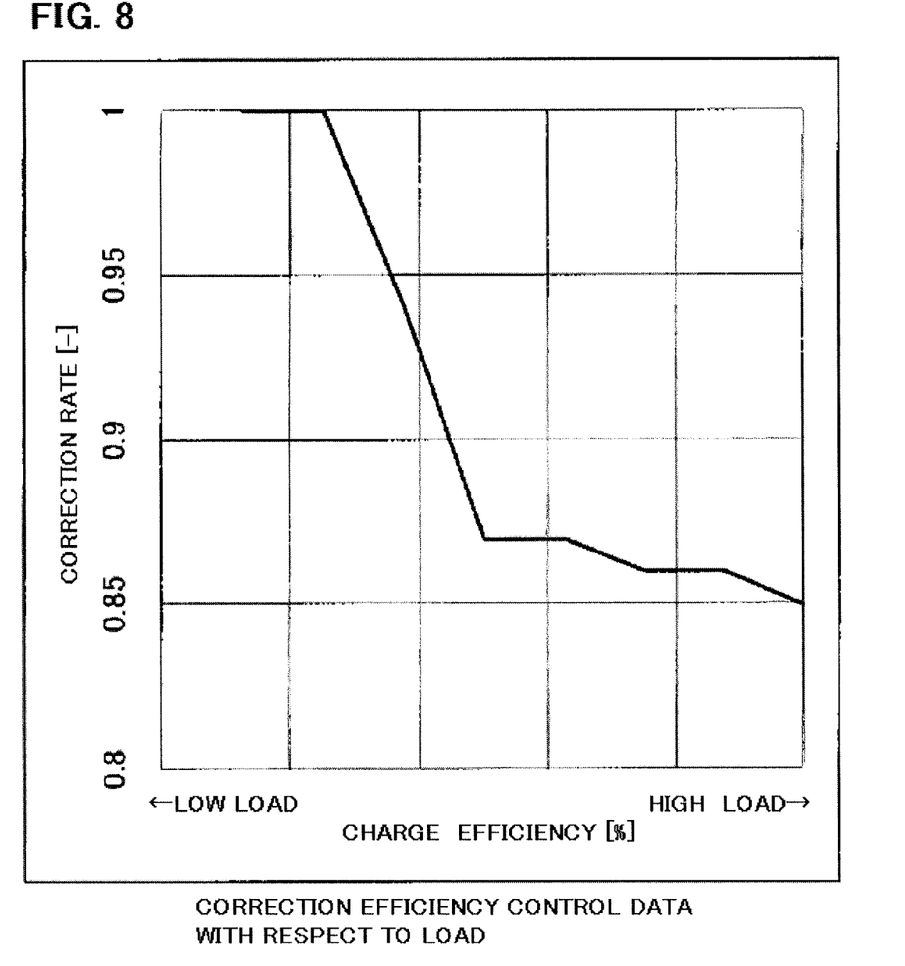
FIG. 8 is a control map showing an example of the correction coefficient control data stored in the engine control unit in FIG. 1.

Therefore, in the memory of the engine control unit 11 according to the present embodiment, basic control data shown in FIG. 4, the variation control data shown in FIG. 7, and the correction coefficient control data shown in FIG. 8 are stored, respectively.

The basic control data shown in FIG. 4 represents data obtained by an experiment or a computer simulation and shows an optimal ignition timing (indicated by a MBT equivalent line in the graph) with respect to an engine rotation speed (horizontal axis, rpm) of the engine EG and an engine load (charging efficiency (%) in the vertical axis) and may be configured as a control map. The specific fuel injection timing is not limited in particular, but may be set arbitrarily (In this embodiment, a constant fuel injection timing is set throughout the entire region of rotation speed and load). The equivalent lines in the figure indicates that the optimal ignition timing is delayed or retarded (see upper left of the graph) as the engine rotation speed is low and the engine load is high. Conversely, as the engine rotation speed increases and engine load decreases, the optimal ignition timing advances (see right lower portion of the graph). Note that the specific characteristic (profile of the equivalent lines) in the figure is only an example and does not pose any restriction on the present invention.

The variation control data shown in FIG. 7 shows data obtained by an experiment or through a computer simulation regarding the (relative) variations or amount of change in the optimal ignition timing with respect to an engine rotation speed (rpm in horizontal axis) and a fuel injection timing (degATDC in the vertical axis) and may be configured as a control map, for example. The variations or change amount in the present embodiment correspond to the fuel injection start timing and the optimal ignition timing in crank degrees, "deg". The equivalent lines in the figure shows that the variations in the optimal ignition timing is smaller as the engine rotation speed is lower and the fuel injection timing is delayed or retarded (in the figure, indicated by "small" and thus relatively more retarded or delayed as compared to "large"). On the other hand, the variations in the optimal ignition timing will be larger as the engine rotation speed is higher and the fuel injection timing is at the retard or delayed side (in the figure, indicated by "large" and thus relatively advanced as compared to "small"). Note that the specific characteristic in the figure (profile of the equivalent lines) is only an example and the no limitation is posed on the present invention.

The correction coefficient control data shown in FIG. 8 is data obtained through experiments or computer simulation and represent a rate of variations in the optimal ignition timing with respect to an engine load while assuming the correction coefficient (gain) being "1" (i.e., correction amount is equal to "0") at a predetermined load when the variation control data shown in FIG. 7 has been acquired. Instead of a control map shown, a functional expression of an engine load and correction coefficient or rate may be used. The characteristic in the figure shows that the correction coefficient becomes smaller as the engine load is higher. Note that the specific characteristic (profile) line in the figure is only an example and does not pose limitation on the present invention.

As described above, the fuel injection timing at which the variation of the optimum ignition timing with respect to a change in engine load becomes the peak is about the same, and the movement of the variations in the optimal ignition timing with respect to engine load is about the same. In other words, although the absolute value of the optimal ignition timing with respect to an engine load may change even at a change in engine rotation speed. Specifically, although the absolute value of the optimal ignition timing may vary in response to change of engine load, the relative characteristic (profile) does not substantially change. Therefore, with respect to a current or actual engine load detected, by considering only a correction coefficient with respect to change in engine load, the calculation process may be simplified and the number of control maps may be reduced accordingly.

Now description is made of a control procedure.

Figure 2:
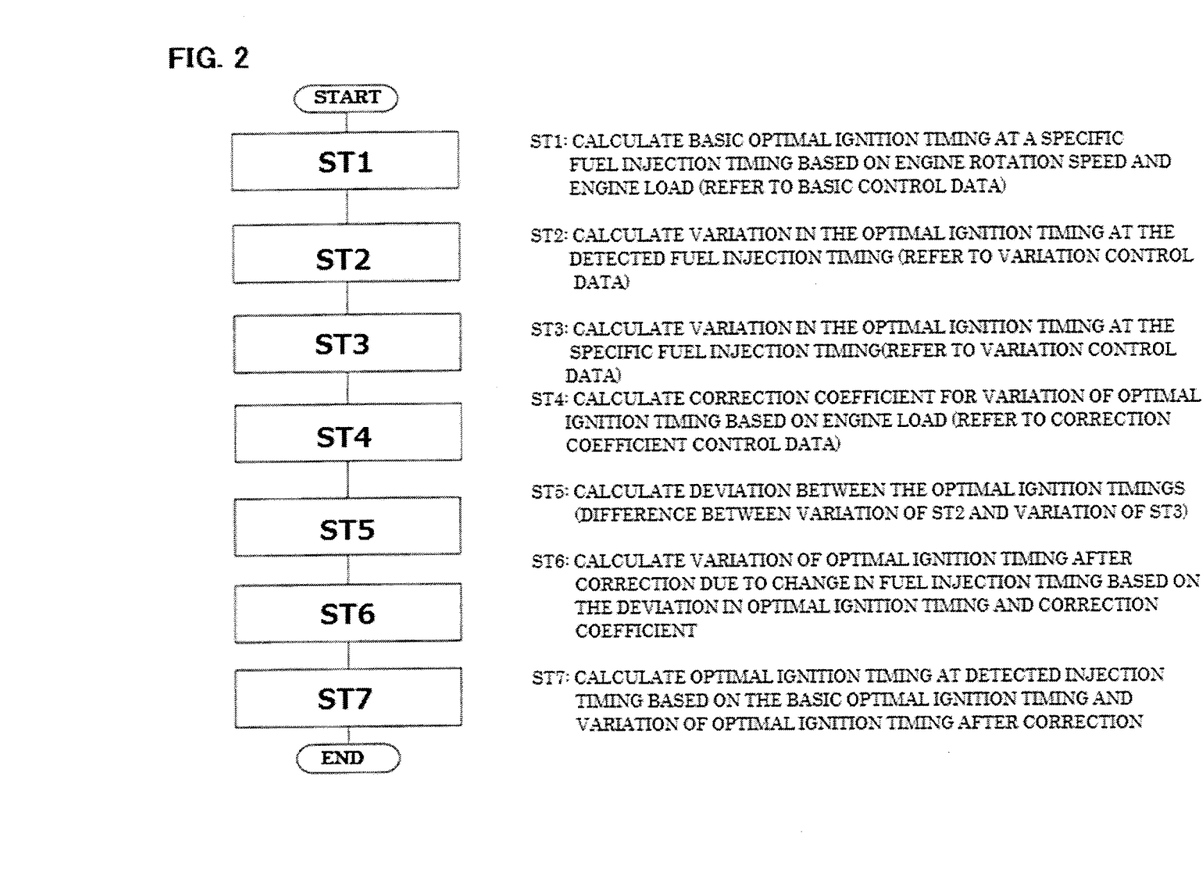
FIG. 2 is a flowchart illustrating a procedure of ignition timing control executed by the engine control unit in FIG. 1.

FIG. 2 is a flowchart illustrating a procedure of ignition timing control executed by the engine controller 11.

In the following steps, the engine rotation speed is detected by a crank angle sensor 131, an engine load is detected by an accelerator opening sensor 134, and a fuel injection timing is detected at predetermined time intervals from the control signal of the engine control unit 11.

Figure 3:
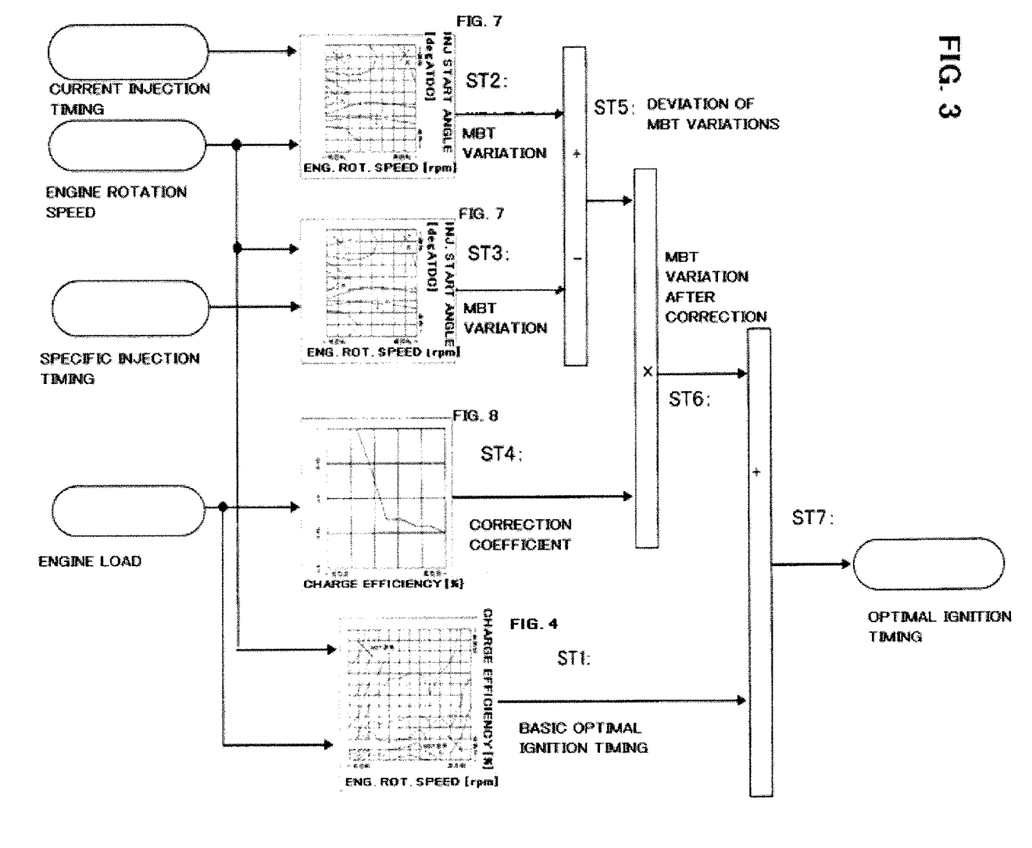
FIG. 3 is a block diagram schematically showing the control procedure of FIG. 2.

First, in step ST1, by substituting or applying detected engine speed and detected engine load to the basic control data shown in FIG. 4, a basic optimum ignition timing at a specific injection timing is calculated, which is indicated by reference ST1 in FIG. 3. Note that this step ST1 may be performed sometime before step ST7 so that it can be carried out immediately before step ST7, for example.

In step ST2, by applying the detected fuel injection timing as well as the detected engine rotation speed to the variation control data shown in FIG. 7, a variation in the optimal ignition timing is calculated, which is indicated by reference ST2 in FIG. 3.

In step ST3, by applying the specific fuel injection timing when the basic control data in FIG. 4 has been acquired and the detected engine rotation speed to the variation control data in FIG. 7, a variation in optimal ignition timing is calculated, which is shown by reference ST3 in FIG. 3.

In step ST4, by applying the detected engine load to the correction coefficient control data shown in FIG. 8, a correction coefficient (gain) for a variation in optimal ignition timing is calculated, which is indicated by reference ST4 in FIG. 3.

In step ST5, a deviation is calculated between the variation in the optimal ignition timing calculated in step ST2 and the variation in the optimal ignition timing calculated in step ST3, which is indicated by reference ST5 in FIG. 3. Note that it is sufficient for this step ST5 to be performed somewhere between step ST3 and step ST6. Thus this step may be performed immediately after step ST3.

In step ST6, by multiplying the deviation of the variations in the basic optimal ignition timing as calculated in step ST1 by the correction coefficient (gain) calculated in step 4, an optimal ignition timing after correction is calculated in step ST6 the deviation of the variation in the optimum ignition timing calculated as indicated by reference ST6 in FIG. 3.

In step ST7, by adding the basic optimum ignition timing calculated in step ST1 to the variation in the optimal ignition timing after correction, a final optimal ignition timing is calculated as indicated by reference ST7 in FIG. 3.

As described above, according to the ignition timing control apparatus for an internal combustion engine according to the present embodiment, with respect to engine rotation speed, an optimal ignition timing control data (FIG. 7) with respect to a fuel injection timing is required per the engine rotation speed. However, with respect to the detected engine load, since the variation in the optimal ignition timing may be corrected by a linear equation that calculates a correction coefficient of the optimal ignition timing with respect to change in engine load. Thus the necessity of referring to a plurality of control maps is removed so that the preparatory effort (for fitting process) of the control maps and the calculation load associated will be reduced.

In the illustrated embodiment, the variation control data in FIG. 7 is set by a relative variation in the optimal ignition timing with respect to an engine rotation speed and a fuel injection timing. In addition, in step ST5 in the flowchart, a deviation between variations is calculated, i.e. a deviation between the variation in the optimal ignition timing with respect to the detected injection timing and the variation in the optimal ignition timing with respect to the specific injection timing is calculated. Alternatively, the control data of the variation in the optimal ignition timing may be previously stored as a variation from the optimal ignition timing at a previously determined fuel injection timing, and by acquiring the variation in the optimal ignition timing based on the detected injection timing and the detected engine rotation speed, a deviation between the variations in the optimal ignition timing may be configured to be calculated.

The control unit 11 corresponds to the injection timing detection unit or mechanism, storing unit or mechanism and control unit whereas the crank angle sensor corresponds to the rotation speed detection unit according to the present invention, and the accelerator pedal opening sensor 134 corresponds to a load detection unit according to the present invention.

DESCRIPTION OF REFERENCE SIGNS

EG . . . engine (internal combustion engine)
11 . . . engine control unit
111 . . . intake passage
112 . . . air filter
113 . . . air flow meter
114 . . . throttle valve
115 . . . collector
116 . . . throttle valve actuator
117 . . . throttle sensor
118 . . . fuel injection valve
119 . . . cylinder
120 . . . piston
121 . . . intake valve
122 . . . exhaust valve
123 . . . combustion chamber
124 . . . spark plug
125 . . . exhaust passage
126 . . . air-fuel ratio sensor
127 . . . exhaust purification catalyst
128 . . . oxygen sensor
129 . . . muffler
130 . . . crankshaft
131 . . . crank angle sensor
132 . . . cooling jacket
133 . . . water temperature sensor
134 . . . accelerator opening sensor

The invention claimed is:
1. An ignition timing control apparatus for a spark ignition internal combustion engine which injects fuel directly into a combustion chamber, comprising:
   an injection timing detection unit for detecting a fuel injection timing;
   a rotation speed detection unit for detecting an engine rotation speed;
   a load detection unit for detecting an engine load;
   a storing unit for storing a first control data of variation in an optimal ignition timing with respect to an engine rotation speed and a fuel injection timing and a second control data of a correction coefficient of the optimal ignition timing with respect to an engine load; and
   a control unit for obtaining an optimal ignition timing based on the fuel injection timing detected by the injection timing detection unit, the engine rotation speed detected by the rotation speed detection unit and the engine load detected by the load detection unit, wherein
   the control unit is programmed to:
      acquire a first variation in the optimal ignition timing based on the detected fuel injection timing and the detected engine rotation speed at a predetermined load by referring to the first control data;
      acquire a second variation in the optimal ignition timing based on a previously determined, specific fuel injection timing and the detected engine rotation speed by referring to the second control data;
      acquire a deviation between the first and second variations of the optimal ignition timing;
      acquire a correction coefficient with respect to the detected engine load by referring to the second control data of the correction coefficient; and
      vary the fuel injection timing based on a corrected optimal ignition timing after correction based on the deviation of the variations of the optimal ignition timing and the correction coefficient.

2. The ignition timing control apparatus for an internal combustion engine as claimed in claim 1, wherein
   the first control data of variations in the optimal ignition timing is stored as the variation from the optimal ignition timing at the previously determined, specific fuel injection timing, and
   the control unit acquires the deviation of the first and second variations in the optimal ignition timing by acquiring the first variation based on the detected fuel injection timing and the detected engine rotation speed by referring to the first control data in the first and second variations of the optimal ignition timing.

3. The ignition timing control apparatus for an internal combustion engine as claimed in claim 1, wherein
   the storing unit stores basic control data of an optimal ignition timing with respect to an engine rotation speed and an engine load at the specific fuel injection timing, and wherein
   the control unit acquires:
      a basic optimal ignition timing at the specific fuel injection timing based on the detected engine rotation speed and the detected engine load by referring to the basic control data, and
      an optimal ignition timing based on the basic optimal ignition timing and the variation of the corrected optimal ignition timing.

4. The ignition timing control apparatus for an internal combustion engine as claimed in claim 2, wherein
   the storing unit stores basic control data of an optimal ignition timing with respect to an engine rotation speed and an engine load at the specific fuel injection timing, and wherein
   the control unit acquires:
      a basic optimal ignition timing at the specific fuel injection timing based on the detected engine rotation speed and the detected engine load by referring to the basic control data, and an optimal ignition timing based on the basic optimal ignition timing and the second variation of the corrected optimal ignition timing.

* * * * *